United States Patent
Kimura et al.

(10) Patent No.: US 10,329,638 B2
(45) Date of Patent: Jun. 25, 2019

(54) HIGH STRENGTH GALVANIZED STEEL SHEET AND PRODUCTION METHOD THEREFOR

(71) Applicant: JFE STEEL CORPORATION, Tokyo (JP)

(72) Inventors: Hideyuki Kimura, Fukuyama (JP); Hiroshi Hasegawa, Fukuyama (JP); Noriaki Kohsaka, Fukuyama (JP); Mai Aoyama, Fukuyama (JP)

(73) Assignee: JFE STEEL CORPORATION, Tokyo (JP)

( * ) Notice: Subject to any disclaimer, the term of this patent is extended or adjusted under 35 U.S.C. 154(b) by 340 days.

(21) Appl. No.: 15/329,117

(22) PCT Filed: Jun. 10, 2015

(86) PCT No.: PCT/JP2015/002904
§ 371 (c)(1),
(2) Date: Jan. 25, 2017

(87) PCT Pub. No.: WO2016/013145
PCT Pub. Date: Jan. 28, 2016

(65) Prior Publication Data
US 2017/0211164 A1    Jul. 27, 2017

(30) Foreign Application Priority Data
Jul. 25, 2014  (JP) ................. 2014-152097

(51) Int. Cl.
| | |
|---|---|
| *C21D 9/46* | (2006.01) |
| *C23C 2/02* | (2006.01) |
| *C23C 2/06* | (2006.01) |
| *C23C 2/26* | (2006.01) |
| *C23C 2/28* | (2006.01) |
| *C22C 38/00* | (2006.01) |
| *C22C 38/14* | (2006.01) |
| *C22C 38/58* | (2006.01) |
| *B21B 1/22* | (2006.01) |
| *B32B 15/01* | (2006.01) |
| *C21D 8/02* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/24* | (2006.01) |
| *C22C 38/26* | (2006.01) |
| *C22C 38/28* | (2006.01) |
| *C22C 38/32* | (2006.01) |
| *C22C 38/38* | (2006.01) |
| *C22C 18/00* | (2006.01) |

(52) U.S. Cl.
CPC ............. *C21D 9/46* (2013.01); *B21B 1/22* (2013.01); *B32B 15/013* (2013.01); *C21D 8/0226* (2013.01); *C21D 8/0236* (2013.01); *C21D 8/0263* (2013.01); *C21D 8/0278* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/24* (2013.01); *C22C 38/26* (2013.01); *C22C 38/28* (2013.01); *C22C 38/32* (2013.01); *C22C 38/38* (2013.01); *C22C 38/58* (2013.01); *C23C 2/02* (2013.01); *C23C 2/06* (2013.01); *C23C 2/26* (2013.01); *C23C 2/28* (2013.01); *B21B 2001/221* (2013.01); *B21B 2001/225* (2013.01); *B32B 2255/06* (2013.01); *B32B 2255/205* (2013.01); *B32B 2307/536* (2013.01); *C21D 2211/002* (2013.01); *C21D 2211/005* (2013.01); *C21D 2211/008* (2013.01); *C22C 18/00* (2013.01)

(58) Field of Classification Search
None
See application file for complete search history.

(56) References Cited

U.S. PATENT DOCUMENTS

| | | | |
|---|---|---|---|
| 6,558,815 | B1 | 5/2003 | Suzuki et al. |
| 2012/0031528 | A1 | 2/2012 | Hayashi et al. |
| 2013/0048151 | A1 | 2/2013 | Kawamura et al. |

FOREIGN PATENT DOCUMENTS

| | | |
|---|---|---|
| JP | 2587724 B2 | 3/1997 |
| JP | 2002-088459 A | 3/2002 |
| JP | 2004-263271 A | 9/2004 |
| JP | 3956550 B2 | 8/2007 |
| JP | 2011-179030 A | 9/2011 |
| JP | 4924730 B2 | 4/2012 |
| JP | 5255361 B2 | 8/2013 |
| JP | 5374193 B2 | 12/2013 |
| JP | 5434960 B2 | 3/2014 |
| KR | 10-2013-0006507 A | 1/2013 |
| WO | 2010/137317 A1 | 12/2010 |

OTHER PUBLICATIONS

Sep. 13, 2018 Notice of Allowance issued in Korean Patent Application No. 10-2017-7002129.

(Continued)

Primary Examiner — Jenny R Wu
(74) Attorney, Agent, or Firm — Oliff PLC

(57) ABSTRACT

A high strength galvanized steel sheet that has a tensile strength (TS) of 780 MPa or higher and excellent bendability, fatigue resistance, and surface appearance quality and a method for producing the high strength galvanized steel sheet. The steel sheet includes, at a position ½ of a thickness of the steel sheet, 5% or more and 80% or less of a ferrite phase in terms of area fraction, 20% or more and 70% or less of a martensite phase in terms of area fraction, and 0% or more and 25% or less of a bainite phase in terms of area fraction.

10 Claims, No Drawings

(56) References Cited

OTHER PUBLICATIONS

Sep. 15, 2015 International Search report issued in International Patent Application No. PCT/JP2015/002904.
Sep. 15, 2015 Written Opinion issued in International Patent Application No. PCT/JP2015/002904.
Oct. 11, 2017 Office Action issued in Chinese Patent Application No. 201580041171.1.

HIGH STRENGTH GALVANIZED STEEL SHEET AND PRODUCTION METHOD THEREFOR

TECHNICAL FIELD

This application relates to a high strength galvanized steel sheet that is suitable for use in frame parts of automotive bodies, has excellent bendability, fatigue resistance, and surface appearance quality, and has a tensile strength (TS) of 780 MPa or higher, and to a production method therefor.

BACKGROUND

High strength galvanized steel sheets for use in automotive parts etc., are required to exhibit excellent formability as well as high strength due to their characteristic usage.

In recent years, there are increasing pressures for better automotive fuel efficiency in order to regulate the $CO_2$ emission from the viewpoint of global environmental protection. Furthermore, in order to ensure safety of occupants at the time of crash, there are also increasing pressures for higher safety mainly concerning crash safety properties of automotive bodies. Due to these concerns, weight reduction of automotive bodies and strengthening of automotive bodies have been actively pursued.

In order to reduce weight and increase strength of automotive bodies at the same time, it is allegedly effective to increase strength of parts material and decrease weight by decreasing the sheet thickness by an amount that does not cause problems associated with rigidity. Recently, high strength steel sheets have been increasingly employed in automotive parts and steel sheets used as structural parts and reinforcing parts of automotive now exhibit tensile strength (TS) as high as 780 MPa or higher, preferably 980 MPa or higher, and more preferably 1180 MPa or higher. It has been a typical practice to form high strength steel sheets into shapes that need light working; however, a possibility of forming them into parts with complicated shapes is now being investigated.

Typically, steel sheets tend to show lower formability as their strength is increased. A challenge associated with use of high strength steel sheets is how to suppress cracking in press-forming. In particular, bendability is important for high strength steel sheets with a tensile strength of 780 MPa or higher since there are more parts to be worked by bending. Due to gauge down of parts associated with increasing strength, there may be more parts that require plane bending-fatigue properties higher than conventionally required. Moreover, a high strength steel sheet with a tensile strength of 780 MPa or higher achieves the high strength by increasing the amounts of C, Mn, etc., to be added in order to obtain a particular amount of martensite and by increasing the amount of Si added to solution-strengthen the ferrite phase. Since Si is oxidizable element prone to oxidization compared to Mn and Fe, ensuring zinc coatability and surface appearance quality is an issue in producing a galvanized steel sheet or galvannealed steel sheet that contains large quantities of Si and Mn. That is, Si and Mn contained in the steel undergo selective oxidation even in a non-oxidizing atmosphere or a reducing atmosphere used in a typical annealing furnace and thereby form oxides by surface segregation. The presence of these oxides of Si and Mn degrades wettability of molten zinc to the steel sheet in the coating process and bare spots may occur as a result.

To address this issue, in Patent Literature 1, a steel sheet is preliminarily heated in an oxidizing atmosphere so as to rapidly generate an Fe oxide film on a surface at a particular oxidation rate or higher to thereby prevent oxidation of additive elements on the steel sheet surface, and then the Fe oxide film is reduced by reduction annealing to improve wettability to molten zinc. However, if the amounts of oxides in the steel sheet is high, iron oxide may adhere to rolls in the furnace and pressing flaw may appear on the steel sheet, which is a problem.

Patent Literature 2 discloses a galvanizing method that involves pickling a steel sheet after annealing to remove oxides on the surface and then again annealing the pickled steel sheet. However, although Patent Literature 2 describes a steel sheet having strength of the 590 MPa TS grade, it makes no mention of steel sheets having TS of 780 MPa or higher, bendability, or fatigue properties.

Patent Literature 3 discloses a method for producing a high strength galvanized steel sheet having excellent bendability and fatigue properties and a tensile strength of 980 MPa or higher, in which the ferrite phase accounts for more than 70% of a microstructure of a steel sheet surface portion that extends from the surface of the steel sheet to a depth of 10 µm, the ferrite fraction of a steel sheet inner layer portion that extends from the depth of 10 µm from the surface toward the interior is 20% to 70%, and the average crystal grain diameter is 5 µm or less. According to this technology, the air ratio during the primary heating process from 200° C. to an intermediate temperature of 500° C. to 800° C. is adjusted to 1.10 to 1.20 so that Fe oxides are formed on the steel sheet surface, oxygen in the oxides bonds to C in the steel to decrease the amount of dissolved C, and the ferrite volume fraction increases in the steel sheet surface layer portion only. The literature describes that bendability is improved without degrading fatigue properties in this manner. However, when a high air ratio is used during the annealing process, the oxides that segregated on the surface decrease the wettability to the molten zinc during the coating process and bare spot may be created. Moreover, the iron oxides may adhere to the rolls in the surface and pressing flaw may appear on the steel sheet. Furthermore, in Patent Literature 3, bendability is evaluated by visually observing presence/absence of cracks on the outer side of the bend, obtaining a minimum bend radius that does not generate cracks, and determining the ratio of the minimum bend radius to the thickness. However, as the strength of the steel sheet increases, evaluation of bendability has become more stringent; for example, presence/absence of cracks must be evaluated by using a magnifying glass or a microscope. Small cracks which have not been considered as cracks in the conventional art must also be evaluated.

Patent Literature 4 discloses a high strength galvanized steel sheet that has a tensile strength of 980 MPa or higher and excellent formability, weldability, and fatigue properties. This high strength galvanized steel sheet contains less C, P, and S from the viewpoints of formability and weldability and less Cr and more Si from the viewpoint of fatigue properties, and contains a ferrite phase having a volume fraction of 20% to 70% and an average crystal grain size of 5 µm or less. While presence/absence of cracks on the outer side of the bend is visually observed to evaluate bendability in Patent Literature 4, evaluation of bendability has become more stringent as the strength of the steel sheet increases. For example, presence/absence of cracks must be evaluated by using a magnifying glass or a microscope. Small cracks which have not been considered as cracks in the conventional art must also be evaluated. Furthermore, in order to improve fatigue properties, 0.35% or more and less than 0.80% of Si is added; although Patent Literature 4 describes bare spots can still be avoided at this amount, Si is more prone to oxidation than Fe and thus ensuring coatability arises as an issue in actual procedures. However, Patent Literature 4 does not mention any specific techniques for ensuring coatability and description related to evaluation of coating surface appearance quality is not found in Examples also.

Patent Literature 5 and Patent Literature 6 each disclose a galvanized steel sheet having a tensile strength of 780 MPa or higher and excellent bendability and fatigue strength. This galvanized steel sheet has a polygonal ferrite microstructure and a low-temperature transformed microstructure; and when a plane at a depth 0.1 mm from the steel sheet surface is observed by changing positions in the sheet thickness direction with a microscope to obtain 20 view areas, the maximum value of the polygonal ferrite area fraction is 80% or less and the minimum value is 10% or more, and the difference between the maximum value and the minimum value is 40% or less. However, in evaluating the bendability, one side of a test piece is fixed with a die and a punch is brought down at a clearance equal to a test piece thickness +0.1 mm so that 90° bending can be performed along the radius of the die shoulder. According to this procedure, the apex of the bend is subject to a different deformation mode than that in the 90° bend test according to a V-block bend method prescribed in JIS Z 2248 and therefore the minimum bend radius may sometimes be evaluated smaller (in other words, evaluated to have high bendability) than in the V-block bend method. Moreover, presence/absence of cracks is checked by observation with a magnifying glass and judged on the basis of whether hair cracks occur. However, the magnifying power of the magnifying glass is not disclosed and the hair cracks are not specifically defined. For example, assuming that the hair cracks are cracks with size of a diameter of a strand of hair, that size is about 0.1 mm which will appear to be 3 mm if observed with a 30× magnifying glass. If a 30× magnifying glass is employed, it is possible that smaller cracks can be observed. Considering the current trends of increasing severity of the bend evaluation method associated with the increase in strength of the steel sheet, evaluation of smaller cracks is necessary. Furthermore, Patent Literature 6 does not include descriptions related to the technology for ensuring coatability. Patent Literature 5 only describes that the Si content is adjusted to less than 0.6% (preferably 0.5% or less and more preferably 0.3% or less) in order to use the steel sheet for galvanizing without a special facility (Fe pre-coating or the like). No examples describe evaluation of the surface appearance quality.

CITATION LIST

Patent Literature

[PTL 1] Japanese Patent No. 2587724
[PTL 2] Japanese Patent No. 3956550
[PTL 3] Japanese Patent No. 5434960
[PTL 4] Japanese Patent No. 4924730
[PTL 5] Japanese Patent No. 5374193
[PTL 6] Japanese Patent No. 5255361

SUMMARY

Technical Problem

The disclosed embodiments have been made under the above-described circumstances and an object thereof is to provide a galvanized steel sheet that contains C, Mn, and other elements necessary for increasing the strength to TS 780 MPa and that has excellent surface appearance quality, bendability, and fatigue resistance and a production method therefor.

Solution to Problem

The inventors have thoroughly studied various factors that affect strength, bendability, fatigue resistance, and surface appearance quality of various thin steel sheets in developing high strength steel sheets for use in frame parts of automotive bodies in order to achieve the object described above. As a result, the inventors have found that when a steel sheet containing C, Mn, etc., is subjected to soft reduction and pickling after primary annealing conditions are appropriately controlled, strain can be introduced to only the vicinity of the surface layer while removing the surface oxides. Moreover, since grain growth occurs in the surface layer only in the subsequent secondary annealing step, a hardness distribution can be given in the sheet thickness direction, and a high strength galvanized steel sheet having excellent bendability and fatigue resistance and excellent surface appearance quality is obtained.

The disclosed embodiments have been made based on the above-described findings and are summarized as follows.

{1} A high strength galvanized steel sheet having a tensile strength of 780 MPa or higher and excellent bendability, fatigue resistance, and surface appearance quality has a composition that contains, in terms of % by mass, C: 0.05% or more and 0.15% or less, Si: 0.01% or more and 1.00% or less, Mn: 2.2% or more and 3.5% or less, P: 0.001% or more and 0.050% or less, S: 0.010% or less, sol. Al: 0.005% or more and 0.100% or less, N: 0.0001% or more and 0.0060% or less, at least one selected from Nb: 0.01% or more and 0.10% or less and Ti: 0.01% or more and 0.10% or less, and the balance being Fe and unavoidable impurities, in which a microstructure at a position ½ of a thickness of the steel sheet includes 5% or more and 80% or less of a ferrite phase in terms of area fraction, 20% or more and 70% or less of a martensite phase in terms of area fraction, and 0% or more and 25% or less of a bainite phase in terms of area fraction. Moreover, a hardness at a position 5 μm from a surface layer of the steel sheet in a thickness direction is 80% or less of a hardness at the position ½ of the thickness and a hardness at a position 15 μm from the surface layer of the steel sheet in the thickness direction is 90% or more of the hardness at the position ½ of the thickness.

{2} The high strength galvanized steel sheet having a tensile strength of 780 MPa or higher and excellent bendability, fatigue resistance, and surface appearance quality described in {1} above, in which the composition further contains, in terms of % by mass, at least one selected from Mo: 0.05% or more and 1.00% or less, V: 0.02% or more and 0.50% or less, Cr: 0.05% or more and 1.00% or less, and B: 0.0001% or more and 0.0030% or less.

{3} A method for producing a high strength galvanized steel sheet that has a tensile strength of 780 MPa or higher and excellent bendability, fatigue resistance, and surface appearance quality and that includes, at a position ½ of a thickness of the steel sheet, 5% or more and 80% or less of a ferrite phase in terms of area fraction, 20% or more and 70% or less of a martensite phase in terms of area fraction, and 0% or more and 25% or less of a bainite phase in terms of area fraction, in which a hardness at a position 5 μm from a surface layer of the steel sheet in a thickness direction is 80% or less of a hardness at the position ½ of the thickness and a hardness at a position 15 μm from the surface layer of the steel sheet in the thickness direction is 90% or more of the hardness at the position ½ of the thickness. The method includes hot rolling a steel slab having the composition according to {1} or {2} described above, cold rolling the resulting hot rolled sheet, performing primary annealing, soft reduction rolling, pickling, and secondary annealing, and galvanizing the resulting steel sheet. In the primary annealing, heating is carried out at an average heating rate of 0.1° C./second or more and less than 3° C./second in a temperature range of 600° C. to 750° C., an annealing temperature of 750° C. to 850° C. is held for 10 to 500 seconds, and cooling is carried out at an average cooling rate of 1 to 15° C./second from the annealing temperature to a cooling stop temperature not higher than 600° C. In the soft reduction rolling, soft reduction is carried out at a rolling reduction of 0.3% or more and 2.0% or less. In the pickling, a pickling weight loss of the steel sheet is adjusted to 0.05 to 5 g/m$^2$ on an Fe basis. In the secondary annealing, an annealing temperature of 750° C. to 850° C. is held for 10 to 500 seconds and cooling is then carried out at an average cooling rate of 1 to 15° C./second from the annealing temperature; and the resulting steel sheet is dipped in a zinc coating bath to galvanize the steel sheet. Furthermore, cooling is carried out to a temperature of 150° C. or lower at an average cooling rate of 5 to 100° C./second after the galvanizing.

{4} The method for producing a high strength galvanized steel sheet that has a tensile strength of 780 MPa or higher and excellent bendability, fatigue resistance, and surface appearance quality and that includes, at a position ½ of a thickness of the steel sheet, 5% or more and 80% or less of a ferrite phase in terms of area fraction, 20% or more and 70% or less of a martensite phase in terms of area fraction, and 0% or more and 25% or less of a bainite phase in terms of area fraction, in which a hardness at a position 5 μm from a surface layer of the steel sheet in a thickness direction is 80% or less of a hardness at the position ½ of the thickness and a hardness at a position 15 μm from the surface layer of the steel sheet in the thickness direction is 90% or more of the hardness at the position ½ of the thickness according to {3} described above, in which cooling is started within 3 seconds after completion of finish rolling and the resulting steel sheet is cooled at an average cooling rate of 5 to 200° C./second in a temperature range of a finish rolling temperature to 100° C. below the finish rolling temperature and is coiled at a coiling temperature of 450° C. to 650° C., and in the cold rolling, rolling is carried out at a rolling reduction of 30% or more.

{5} The method for producing a high strength galvanized steel sheet that has a tensile strength of 780 MPa or higher and excellent bendability, fatigue resistance, and surface appearance quality in which a hardness at a position 5 μm from a surface layer of the steel sheet in a thickness direction is 80% or less of a hardness at the position ½ of the thickness and a hardness at a position 15 μm from the surface layer of the steel sheet in the thickness direction is 90% or more of the hardness at the position ½ of the thickness according to {3} or {4} described above, in which the method further includes alloying treatment after the galvanizing.

In the disclosed embodiments, a high strength galvanized steel sheet refers to a galvanized (GI) steel sheet or galvannealed (GA) steel sheet formed by alloying a galvanized steel sheet having a tensile strength (TS) of 780 MPa or higher.

Advantageous Effects

According to the disclosed embodiments, a high strength galvanized steel sheet having a high tensile strength (TS) of 780 MPa or higher, preferably 980 MPa or higher, and more preferably 1180 MPa or higher and excellent bendability, fatigue resistance, and surface appearance quality is obtained. When the high strength galvanized steel sheet of the disclosed embodiments is adopted to a frame part of automotive bodies, crash safety properties can be improved and weight-reduction can be achieved.

DESCRIPTION OF EMBODIMENTS

The disclosed embodiments will now be described in detail.

First, the reasons for defining the composition of the disclosed embodiments are described. The notation "%" related to components means % by mass.

C: 0.05% or more and 0.15% or less

Carbon (C) is an element effective for increasing the strength of a steel sheet and contributes to high strength by forming martensite. Carbon (C) also contributes to high strength by forming fine alloy compounds or alloy carbonitrides with carbide-forming elements such as Nb and Ti. In order to obtain these effects, the C content needs to be 0.05% or more. At a C content exceeding 0.15%, however, spot weldability is significantly deteriorated, the steel sheet becomes hard due to increasing martensite phase, and formability such as bendability may be degraded. Thus, the C content is to be 0.05% or more and 0.15% or less. In order to stably obtain a TS of 980 MPa or higher, the C content is preferably 0.08% or more. In order to stably obtain a TS of 1180 MPa or higher, the C content is more preferably 0.12% or more.

Si: 0.01% or more and 1.00% or less

Silicon (Si) is an element that contributes to increasing strength mainly by solid solution strengthening and is also an element that contributes to improving not only the strength but also the balance between strength and ductility since a decrease in ductility is relatively small with respect to the increase in strength. In order to obtain this effect, the Si content needs to be 0.01% or more. At a Si content exceeding 1.00%, Si-based oxides are likely to form on the steel sheet surface and may cause bare spots. Thus, the Si content is to be 0.01% or more and 1.00% or less and is preferably 0.01% or more and 0.05% or less.

Mn: 2.2% or more and 3.5% or less

Manganese (Mn) is an element that contributes to increasing strength through solid solution strengthening and by forming martensite. In order to obtain this effect, the Mn content needs to be 2.2% or more. At a Mn content exceeding 3.5%, the raw material cost is increased and the resulting microstructure will have different transformation points at different positions due to segregation of Mn and other factors. As a result, an inhomogeneous microstructure in which ferrite phase and martensite phase exist in a banded pattern is likely to be formed and formability such as bendability may be degraded. Moreover, Mn is found in high concentration on the steel sheet surface by forming oxides and may cause bare spots. Manganese may degrade toughness of the spot welded zone and may degrade welding properties. Thus the Mn content is to be 2.2% or more and 3.5% or less. In order to stably obtain a TS of 980 MPa or higher, the Mn content is preferably 2.5% or more. In order to stably obtain a TS of 1180 MPa or higher, the Mn content is more preferably 2.7% or more.

P: 0.001% or more and 0.050% or less

Phosphorus (P) is an element effective for increasing strength of a steel sheet through solid solution strengthening. However, at a P content less than 0.001%, not only such an effect is not obtained but also the cost for dephosphorization in the steelmaking process may rise. Thus, the P content is to be 0.001% or more. At a P content exceeding 0.050%, weldability is notably deteriorated. Thus, the P content is to be 0.001% or more and 0.050% or less. The P content is preferably 0.001% or more and 0.030% or less.

S: 0.010% or less

Sulfur (S) is a harmful element that causes hot brittleness and degrades formability of the steel sheet by forming sulfide-based inclusions in the steel. Thus, the S content is preferably as low as possible and the upper limit of the S content in the disclosed embodiments is 0.010%. Preferably, the S content is 0.008% or less. The lower limit of the S content is not particularly limited. Since an ultralow S content (excessively decreasing the S content) increases the steelmaking cost, the S content is preferably 0.0001% or more.

Sol. Al: 0.005% or more and 0.100% or less

Aluminum (Al) is an element added as a deoxidizing agent. Since Al also has a solid solution strengthening ability, it is effective for increasing strength. However, if the Al content as sol. Al is less than 0.005%, such an effect is not obtained. If the Al content as sol. Al exceeds 0.100%, the raw material cost increases and surface defects of the steel sheet may occur. Thus, the Al content as sol. Al is to be 0.005% or more and 0.100% or less.

N: 0.0001% or more and 0.0060% or less

At a nitrogen (N) content exceeding 0.0060%, an excessively large amount of nitrides may form in the steel and not only ductility and toughness but also the surface properties of the steel sheet may be degraded thereby. Thus, the N content is to be 0.0060% or less and is preferably 0.0050% or less. From the viewpoint of improving ductility by cleaning of ferrite, the N content is preferably as low as possible. However, achieving an ultralow N content (excessively decreasing the N content) increases the steelmaking cost and thus the lower limit of the N content is to be 0.0001%. The N content therefore is to be 0.0001% or more and 0.0060% or less. The N content is preferably 0.0050% or less.

At least one selected from Nb: 0.01% or more and 0.10% or less and Ti: 0.01% or more and 0.10% or less Nb: 0.01% or more and 0.10% or less Niobium (Nb) contributes to increasing strength by forming carbides and carbonitrides with C and N. It also contributes to improving bendability through its effect of precipitation-strengthening the ferrite and decreasing the difference in hardness between the martensite phase and the ferrite. Niobium (Nb) also has an effect of refining a hot rolled sheet microstructure so that ferrite and martensite after cold rolling and annealing are homogeneously refined. Niobium (Nb) contributes to improving bendability through this homogenous refinement of the steel sheet microstructure. In order to obtain such effects, the Nb content is to be 0.01% or more if any Nb is to be contained. Preferably, the Nb content is 0.03% or more. When Nb is contained in an amount exceeding 0.10%, which is excessively large, hot rolling load is increased, deformation resistance in cold rolling is increased, and thus actual production process may become difficult to stably carry out. Moreover, ductility of ferrite may be degraded and formability such as bendability may be degraded. Thus, the Nb content is to be 0.01% or more and 0.10% or less and is preferably 0.03% or more and 0.10% or less.

Ti: 0.01% or more and 0.10% or less

As with Nb, titanium (Ti) contributes to increasing strength by forming carbides and carbonitrides with C and N. It also contributes to improving bendability through its effect of precipitation-strengthening the ferrite and decreasing the difference in hardness between the martensite phase and the ferrite. As with Nb, Ti has an effect of refining a hot rolled sheet so that the ferrite and martensite after cold rolling and annealing are homogeneously refined. Titanium (Ti) contributes to improving bendability through this homogenous refinement of the steel sheet microstructure. In order to obtain such effects, the Ti content is to be 0.01% or more if any Ti is to be contained. Preferably, the Ti content is 0.03% or more. At a Ti content exceeding 0.10%, not only these effects are saturated but also Ti precipitates excessively into ferrite and ductility of the ferrite is degraded. Thus, the Ti content is to be 0.01% or more and 0.10% or less and is preferably 0.03% or more and 0.10% or less.

The balance other than the components described above is Fe and unavoidable impurities.

In the disclosed embodiments, at least one element selected from Mo, V, Cr, and B may be contained as needed in addition to the essential additive elements described above.

At least one selected from Mo: 0.05% or more and 1.00% or less, V: 0.02% or more and 0.50% or less, Cr: 0.05% or more and 1.00% or less, and B: 0.0001% or more and 0.0030% or less Molybdenum (Mo) and chromium (Cr) are elements that improve hardenability and contribute to increasing strength by forming martensite, and can be contained as needed. In order to obtain such effects, the contents of these elements are preferably 0.05% or more each. When the Mo content and the Cr content each exceed 1.00%, not only the above-described effects are saturated but also the raw material cost is increased. Thus, the content is preferably 1.00% or less for each element.

As with Nb and Ti, vanadium (V) contributes to increasing strength by forming fine carbonitrides and can be contained as needed. In order to obtain this effect, the V content is preferably 0.02% or more. At a V content exceeding 0.50%, not only the effect is saturated but also the raw material cost is increased. Thus the V content is preferably 0.50% or less.

Boron (B) improves hardenability, inhibits generation of ferrite in the course of annealing cooling and contributes to increasing strength by forming martensite. In order to obtain this effect, the B content needs to be 0.0001% or more. At a B content exceeding 0.0030%, this effect is saturated. Thus, the B content is preferably 0.0001% or more and 0.0030% or less.

In the disclosed embodiments, the following elements may be contained as long as the effects of the disclosed embodiments are not impaired.

Copper (Cu) is a harmful element that causes the steel to crack during hot rolling and serves as a cause of surface defects. However, in the disclosed embodiments, adverse effects brought by Cu on the steel sheet properties are small and a Cu content of 0.30% or less is allowable. As a result, scraps etc., can be used and recycled materials become useful.

As with Cu, nickel (Ni) has little effects on the steel sheet microstructure. Nickel also has an effect of preventing occurrence of surface defects caused by addition of Cu. This effect can be obtained when the Ni content is at least half of the Cu content. However, when the Ni content is excessively large, other surface defects caused by non-uniform scale generation are induced. Thus, if any Ni is to be contained, the upper limit of the Ni content is to be 0.30%.

Calcium (Ca) has an effect of improving ductility since it helps control morphology of sulfides such as MnS. However, the effect tends to be saturated if Ca is contained in an excessively large amount. Thus, if Ca is to be contained, the Ca content is to be 0.0001% or more and 0.0050% or less.

Furthermore, a rare earth metal (REM) that has an effect of controlling morphology of sulfide inclusions and thereby improving formability, or Sn or Sb that has an effect of regulating size of crystal grains on the steel sheet surface can be contained in an amount of 0.0001% to 0.100% for each element.

The amounts of elements, such as Zr and Mg, which form precipitates, are preferably as small as possible and such elements do not have to be added intentionally. If they are intentionally added, the amount thereof is to be less than 0.020% and is preferably less than 0.002%.

The above-described elements, namely, Cu, Ni, Ca, REM, Sn, Sb, Zr, and Mg, are sometimes contained in the steel sheet of the disclosed embodiments as unavoidable impurities. Unavoidable impurities refer to not only components that inevitably mix in during the production process but also components that are intentionally added within the range that does not adversely affect the effects of the disclosed embodiments.

Next, the microstructure of the high strength galvanized steel sheet of the disclosed embodiments is described.

The microstructure of the high strength galvanized steel sheet of the disclosed embodiments at a position ½ of the thickness of the steel sheet includes 5% or more and 80% or less of a ferrite phase in terms of area fraction, 20% or more and 70% or less of a martensite phase in terms of area fraction, and 0% or more and 25% or less of a bainite phase in terms of area fraction. The hardness at a position 5 μm from the surface layer of the steel sheet in a sheet thickness direction is 80% or less of the hardness at the position ½ of the thickness of the steel sheet. The hardness at a position 15 μm from the surface layer of the steel sheet in the sheet thickness direction is 90% or more of the hardness at the position ½ of the thickness of the steel sheet.

In order to stably obtain a TS of 780 MPa or higher, 5% or more and 80% or less of a ferrite phase in terms of area fraction, 20% or more and 70% or less of a martensite phase in terms of area fraction, and 0% or more and 25% or less of a bainite phase in terms of area fraction must be present at a position ½ of the thickness of the steel sheet.

Area fraction of ferrite phase: 5% or more and 80% or less

A ferrite phase is a soft phase and contributes to ductility of the steel sheet. In the disclosed embodiments, the area fraction of the ferrite phase is to be 5% or more. If the area fraction of the ferrite phase exceeds 80%, the steel sheet becomes excessively soft and it becomes difficult for the steel sheet to obtain strength and fatigue resistance. Thus, the area fraction of the ferrite phase is to be 5% or more and 80% or less. From the viewpoint of stably obtaining a TS of 980 MPa or higher, the area fraction of the ferrite phase is preferably 65% or less. From the viewpoint of stably obtaining a TS of 1180 MPa or higher, the area fraction of the ferrite phase is more preferably 50% or less.

Area fraction of martensite phase: 20% or more and 70% or less

A martensite phase is a hard phase and is effective for increasing strength of the steel sheet through transformation strengthening of the microstructure. Martensite also serves as a barrier against propagation of fatigue cracks and thus is also effective for improving fatigue properties. From the viewpoint of obtaining strength and fatigue resistance, the area fraction of the martensite phase is to be 20% or more. From the viewpoint of stably obtaining a TS of 980 MPa or higher, the area fraction is preferably 35% or more. From the viewpoint of stably obtaining a TS of 1180 MPa or higher, the area fraction is more preferably 50% or more. When the area fraction of martensite exceeds 70%, bendability may be degraded. Thus, the area fraction of martensite is to be 70% or less.

Area fraction of bainite phase: 0% or more and 25% or less

A bainite phase is effective for increasing strength of steel and improving fatigue resistance as with martensite. Thus, a bainite phase can be contained if its area fraction is 25% or less. When the bainite phase is excessively provided at over 25%, ductility and other properties may be degraded. Thus, the area fraction of the bainite phase is preferably 25% or less.

The balance of the steel sheet microstructure other than the ferrite phase, the martensite phase, and the bainite phase may contain a pearlite phase, a retained austenite phase, carbides, etc. Such phases and the like are allowable if their total area fraction at a position ½ of the sheet thickness is 5% or less.

The above-described area fractions are represented by area fractions found in the microstructure at the position ½ of the thickness, specifically, in the region that extends from a position ⅜ of the thickness to a position ⅝ of the thickness. The area fractions can be determined by polishing an L section (a perpendicular section taken in parallel to the rolling direction) of the steel sheet, corroding the section with nital, observing five or more view areas with a scanning electron microscope (SEM) at a magnification of 2000, and image-analyzing a microstructure photograph taken thereat. While details are described in Examples below, ferrite appears as a slightly dark region in the microstructure photograph, pearlite as a region in which carbides are generated in a lamellar pattern, and bainite as a region in which carbides are generated in rows of dots. In the microstructure photograph, martensite and retained austenite (retained γ) are represented by particles with light shades.

From the viewpoint of achieving both bendability and fatigue resistance, it is important to control the hardness of the surface layer. If the hardness of the steel sheet at the position 5 μm from the surface layer in the thickness direction is more than 80% of the hardness at the position ½ of the thickness, a bendability improving effect is not obtained and good bendability is therefore not obtained. If the hardness of the steel sheet at a position 15 μm from the surface layer in the thickness direction is less than 90% of the hardness at the position ½ of the thickness, good fatigue resistance is not obtained. Thus, from the viewpoint of achieving both bendability and fatigue resistance, the hardness of the steel sheet at the position 5 μm from the surface layer in the thickness direction is to be 80% or less of the hardness at the position ½ of the thickness and the hardness of the steel sheet at a position 15 μm from the surface layer in the thickness direction is to be 90% or more of the hardness at the position ½ of the thickness. The subject of control of the hardness of the steel sheet surface layer may be one side or both sides. As long as the hardness of at least one of the surface layers of the steel sheet is controlled, in other words, as long as the hardness of the surface layer is regulated as described above, the effects of the disclosed embodiments are obtained. The hardness can be measured by the procedure set forth in Examples below. For example, a surface layer on the front side of the coil can be measured. The hardness at a position ½ of the thickness is 260 to 330 in terms of Vickers hardness at the TS 780 MPa level, 330 to 390 at the TS 980 MPa level, and 390 to 440 at the TS 1180 MPa level.

Next, a method for producing a high strength galvanized steel sheet according to the disclosed embodiments is described.

A high strength galvanized steel sheet according to the disclosed embodiments is produced by a process that includes casting a steel having a composition adjusted within the above-described range into a slab, and performing steps of hot rolling, cold rolling, primary annealing, soft reduction rolling, pickling, secondary (final) annealing, and galvanizing.

Slab Casting

A steel slab used in the production method according to the disclosed embodiments is preferably formed by a continuous casting method to prevent macrosegregation of components but may be produced by an ingoting method or a thin slab casting method. In addition to a typical process that involves cooling the casted steel slab to a room temperature and re-heating the cooled steel slab, any of the following energy-saving processes can be employed without difficulty: a process of introducing the hot steel slab without cooling into a heating furnace and hot-rolling the hot steel slab (direct rolling), a process of hot rolling the steel slab immediately after the hot steel slab is recuperated for a short time (direct rolling), and a process of introducing a steel slab still in a high temperature state into a heating furnace so as to omit part of re-heating (hot slab charging).

Slab heating temperature: 1150° C. or higher and 1300° C. or lower (preferable condition)

Precipitates that exist in the heating stage of the steel slab will be found as coarse precipitates in the final product steel sheet and do not contribute to strength. Thus, sufficient amounts of Ti and Nb-based precipitates, which have been formed during casting, must undergo re-solution. There is also a need to conduct scale-off to remove bubbles and defects such as segregation on the slab surfaces so that cracks and irregularities in the steel sheet surfaces can be reduced and the steel sheet surfaces become flat and smooth. From such viewpoints, the slab heating temperature is preferably 1150° C. or higher. At a slab heating temperature exceeding 1300° C., austenite grains coarsen and the final microstructure becomes coarse, possibly degrading bendability and stretch flangeability. Thus, the slab heating temperature is preferably 1150° C. or higher and 1300° C. or lower.

Hot Rolling

The steel slab obtained as above is subjected to hot rolling that involves rough rolling and finish rolling. First, the steel slab is rough-rolled into a sheet bar. The conditions for rough rolling are not particularly limited, and a typical process can be conducted. From the viewpoint of avoiding problems caused by lowering of the surface temperature during hot rolling, it is effective to utilize a sheet bar heater that heats the sheet bar.

Finish rolling temperature: 850° C. to 950° C. (preferable condition)

When the finish rolling temperature is lower than 850° C., the microstructure becomes inhomogeneous and formability such as ductility, bendability, and stretch flangeability may be degraded. At a finish rolling temperature higher than 950° C., the amount of oxides (scale) generated increases rapidly, the interface roughness between base steel and oxides occurs, and the surface quality tends to be deteriorated after pickling and cold rolling. Moreover, the crystal grain size becomes excessively large and the surface roughness properties after press forming may become degraded by working. Thus, the finish rolling temperature is preferably 850° C. to 950° C.

Cooling of the hot rolled sheet that has underwent hot rolling is started within 3 seconds after completion of the finish rolling from the viewpoint of improving stretch flangeability and bendability by further refinement and homogenization of the microstructure. Tan average cooling rate in the temperature range of the finish rolling temperature to 100° C. below the finish rolling temperature is preferably 5 to 200° C./sec and the resulting cooled sheet is preferably coiled at a temperature of 450° C. to 650° C.

Cooling start time: Within 3 seconds, average cooling rate from finish rolling temperature to 100° C. below finish rolling temperature: 5 to 200° C./sec or lower (preferable conditions)

If it takes longer than 3 seconds after completion of finish rolling until start of cooling and the average cooling rate in the temperature range of the finish rolling temperature to 100° C. below the finish rolling temperature is less than 5° C./sec, a coarse ferrite phase is likely to precipitate, the microstructure of the hot rolled sheet tends to be coarse, and a banded structure in which the ferrite phase and the pearlite phase are layered is likely to form. This banded structure indicates that there is non-uniformity in concentration of the components within the steel sheet and is prone to form an inhomogeneous microstructure after cold rolling and annealing, thereby rendering it difficult to form homogeneous fine microstructure. As a result, formability such as bendability and stretch flangeability may be degraded. However, when the average cooling rate in the temperature range of the finish rolling temperature to 100° C. below the finish rolling temperature exceeds 200° C./sec, the effects are saturated. Thus, the average cooling rate in the temperature range of the finish rolling temperature to 100° C. below the finish rolling temperature is preferably 5 to 200° C./sec or less.

Coiling temperature: 450° C. or higher and 650° C. or lower (preferable condition)

The coiling temperature significantly affects precipitation of carbides of Ti and Nb, in particular, NbC. At a coiling temperature lower than 450° C., precipitation of NbC is insufficient and precipitation of NbC tends to be inhomogeneous within the coil. Thus, there is a possibility that bendability may be degraded due to the difference in microstructure caused by recrystallization behavior during annealing heating after cold rolling. At a coiling temperature exceeding 650° C., coarse NbC precipitates and precipitation strengthening of the ferrite phase due to NbC becomes insufficient. Thus, the stretch flangeability and bendability improving effect obtained by the effect of decreasing the difference in hardness between the ferrite phase and the martensite phase may not be obtained. Thus, the coiling temperature is preferably 450° C. or higher and 650° C. or lower and is more preferably 500° C. or higher and 600° C. or lower.

Cold Rolling

After pickling is performed as needed, the pickled steel sheet is cold rolled to prepare a cold rolled sheet. Pickling is not necessary and may be conducted as needed. If pickling is to be conducted, typical conditions apply.

Rolling reduction during cold rolling: 30% or more (preferable condition)

At a rolling reduction lower than 30% during cold rolling, recrystallization that occurs in the heating process of annealing becomes inhomogeneous and a homogeneous fine annealed microstructure may not be obtained. There is also a possibility of degradation of bendability caused by inhomogeneous microstructure. From the viewpoint of promoting recrystallization in the heating process of annealing and obtaining a more homogeneous fine microstructure, the rolling reduction during cold rolling is preferably 30% or more. However, if the rolling reduction exceeds 70%, the load applied to the roll during rolling is increased and there is a possibility that threading becomes difficult. Thus, the rolling reduction is more preferably 30% or more and 70% or less.

Primary Annealing

Average heating rate in temperature range of 600° C. to 750° C.: 0.1° C./sec or more and less than 3° C./sec In the disclosed embodiments, TiC and NbC are precipitated when the steel sheet is at the stage of the hot rolled sheet and thus the recrystallization temperature of the cold rolled steel sheet obtained through the cold rolling step is relatively high and thus the worked microstructure is likely to remain after annealing. In such a case, an inhomogeneous microstructure is likely to form after soft reduction, pickling, and secondary (final) annealing, a homogeneous fine microstructure is difficult to be formed, and formability such as bendability and stretch flangeability may be degraded as a result. Thus, in heating the cold rolled steel sheet to an annealing temperature, recrystallization must be accelerated to obtain homogeneity of the material. From such a viewpoint, the average heating rate in the temperature range of 600° C. to 750° C. must be as low as 3° C./sec or less. Since recrystallization does not occur in the heating temperature range lower than 600° C., adequately controlling the heating rate in such a range may not always give the desired recrystallization microstructure. If slow heating is conducted in the range exceeding 750° C., the ferrite-austenite transformation proceeds and thus the microstructure after secondary (final) annealing may become inhomogeneous due to competition between recrystallization and the ferrite-austenite transformation. When the average heating rate in the temperature range of 600° C. to 750° C. is less than 0.1° C./sec or less, the crystal grain size may increase and bendability and stretch flangeability after secondary (final) annealing may be degraded. Thus, the average heating rate is to be 0.1° C./sec or more.

Holding annealing temperature of 750° C. to 850° C. for 10 to 500 seconds

At an annealing temperature lower than 750° C., recrystallization may not sufficiently complete within the primary annealing and the worked microstructure remaining in the steel may cause formation of an inhomogeneous microstructure after secondary annealing. Moreover, a hard portion remains in the surface layer and the hardness at a position 5 μm from the surface layer will exceed 80% of the hardness at the position ½ of the thickness. As a result, formability such as bendability and stretch flangeability may be degraded. When the annealing temperature exceeds 850° C., the ferrite phase and the austenite phase become coarse during annealing and the microstructure after secondary annealing may become coarse due to coarsening of the microstructure after cooling. As a result, bendability and stretch flangeability may be degraded. Furthermore, there arises a problem of decreased productivity and an increased energy cost. Thus, the annealing temperature is to be 750° C. or higher and 850° C. or lower. The holding time is to be 10 second or lower from the viewpoint of promoting progress of recrystallization. However, when the holding time exceeds 500 seconds, the crystal grain diameter increases and properties of the steel sheet such as strength, surface properties, bendability, and stretch flangeability may be adversely affected. Thus the time to hold annealing is to be 10 seconds or more and 500 seconds or less and is preferably 20 seconds or more and 200 seconds of less.

Average cooling rate from annealing temperature of 750° C. to 850° C. to cooling stop temperature not higher than 600° C.: 1 to 15° C./sec When the average cooling rate from the annealing temperature to the cooling stop temperature not higher than 600° C. exceeds 15° C./sec, generation of the ferrite phase during cooling is inhibited and thus hard phases such as a martensite phase, a bainite phase, a pearlite phase, and a retained austenite phase occur excessively after primary annealing. As a result, the area fractions of the martensite phase and the bainite phase after secondary (final) annealing exceed the range of the disclosed embodiments, the strength is excessively increased, and formability such as ductility, bendability, and stretch flangeability may be degraded as a consequence. In contrast, when the average cooling rate is less than 1° C./sec, the amount of ferrite generated during cooling is excessively increased, a desired amount of martensite cannot be obtained after secondary (final) annealing, and the desired TS may not be obtained. When the cooling stop temperature exceeds 600° C., the desired amount of martensite may not be obtained after secondary (final) annealing and the desired TS may not be obtained. Thus, the average cooling rate from the annealing temperature of 750° C. to 850° C. to the cooling stop temperature not higher than 600° C. is to be 1 to 15° C./sec and is preferably 3 to 15° C./sec. Cooling is preferably conducted by gas cooling but it is possible to use furnace cooling, mist cooling, roll cooling, water cooling, or any combination of the foregoing. The primary annealing is preferably conducted by a continuous annealing method.

Soft Reduction Rolling

Rolling reduction during soft reduction rolling: 0.3% or more and 2.0% or less

Soft reduction rolling of 0.3% or more is conducted after primary annealing to introduce strain to only the superficial layer of the steel sheet. During this process, surface oxides of readily oxidizable elements such as Si and Mn generated during primary annealing become damaged and this facilitates removal of the surface oxides in the subsequent pickling process and effectively improves coatability. In the vicinity of the superficial layer into which strain has been locally introduced, strain-induced grain growth notably occurs during secondary annealing. As a result, the vicinity of the superficial layer has a microstructure in which a large number of relatively coarse ferrite grains are present compared to the center portion in the thickness direction and thus a hardness distribution is given in the sheet thickness direction. In a steel sheet having such a hardness distribution, a soft layer is limited to the superficial layer only and thus bendability can be improved without degrading fatigue resistance. However, if the rolling reduction during soft reduction rolling exceeds 2.0%, not only the above-described effects are saturated but also the region into which strain is introduced is widened. As a result, the depth of the soft layer after secondary annealing increases and the fatigue resistance may be degraded. Thus the rolling reduction during soft reduction rolling is to be 0.3% or more and 2.0% or less.

Pickling

Pickling weight loss of steel sheet: 0.05 to 5 $g/m^2$ on Fe basis

The surface oxides of readily oxidizable elements such as Si and Mn generated during primary annealing significantly degrade coatability after secondary annealing. Thus pickling is performed to remove surface oxides of Si, Mn, etc., and improve coatability. Surface oxides can be completely removed by performing pickling such that the pickling weight loss of the steel sheet is 0.05 to 5 $g/m^2$ on an Fe basis. For example, surface oxides are completely removed by performing for 1 to 20 seconds a pickling treatment that uses an acid (hydrochloric acid, sulfuric acid, nitric acid, etc.) with an acid temperature: 40° C. to 90° C. and an acid concentration: about 1 to 10% by mass. When the concentration of the acid pickling solution is less than 1% by mass, the pickling weight loss becomes less than 0.05 $g/m^2$ on an Fe basis and surface oxides cannot be sufficiently removed by pickling. At a concentration exceeding 10% by mass, the pickling weight loss may exceed 5 $g/m^2$ and the steel sheet surface may become rough due to over-pickling. At an acid temperature lower than 40° C., the pickling weight loss becomes less than 0.05 $g/m^2$ on an Fe basis and surface oxides cannot be sufficiently removed by pickling. At a temperature exceeding 90° C., the pickling weight loss may exceed 5 $g/m^2$ and the steel sheet surface may become rough due to over-pickling. When the pickling time is less than 1 second, surface oxides cannot be sufficiently removed by pickling. When the time exceeds 20 seconds, the steel sheet surface may become rough due to over-pickling. Thus, the preferable pickling conditions are acid temperature: 40° C. to 90° C., acid concentration: 1 to 10% by mass, pickling time: 1 to 20 seconds. More preferable conditions are acid temperature: 50° C. to 70° C. and pickling time: 5 to 10 seconds. The pickling weight loss on an Fe basis can be determined from the steel sheet masses before and after pickling.

Secondary (Final) Annealing

Holding annealing temperature of 750° C. to 850° C. for 10 to 500 seconds

At an annealing temperature lower than 750° C., the desired amount of martensite may not be obtained after annealing cooling and the desired strength may not be obtained. When the annealing temperature exceeds 850° C., the ferrite phase and the austenite phase become coarse during annealing and the microstructure after cooling becomes coarse. Thus, there is a possibility of degradation of strength, bendability, and stretch flangeability. Moreover, Si and Mn removed in the pickling step may again form surface oxides and these surface oxides may deteriorate coatability. There is also a problem of a decreased productivity and an increased energy cost. Thus, the annealing temperature is to be 750° C. or higher and 850° C. or lower. The holding time is to be 10 seconds or longer from the viewpoint of progress of the ferrite-austenite transformation. When the holding time exceeds 500 seconds, the crystal grain size increases and various properties of the steel sheet, such as strength, bendability, and stretch flangeability, may be adversely affected. Moreover, the re-formation of Si and Mn surface oxides may deteriorate coatability. Thus, the holding time for annealing is to be 10 to 500 seconds.

Cooling at average cooling rate (primary cooling rate) of 1 to 15° C./sec from the annealing temperature of 750° C. to 850° C.

After soaking at the above-described annealing temperature, cooling is performed at an average cooling rate (primary cooling rate) of 1 to 15° C./sec until the temperature of a zinc coating bath, which is usually held at 420° C. to 500° C., is reached. When the average cooling rate exceeds 15° C./sec, generation of the ferrite phase is inhibited during cooling and excessive hard phases, such as a martensite phase and a bainite phase, are generated. This excessively increases strength and degrades formability such as ductility, bendability, and stretch flangeability. At an average cooling rate less than 1° C./sec, the amount of the ferrite phase generated during cooling is excessively increased and the desired TS may not be obtained. Thus, the average cooling rate from the annealing temperature to the coating bath (temperature) is to be 1 to 15° C./sec. Cooling is preferably gas cooling but it is possible to perform furnace cooling, mist cooling, roll cooling, water cooling, or any combination of these. Secondary annealing is preferably conducted by a continuous annealing method and is particularly preferably conducted by using a continuous galvanizing line (CGL) equipped with facilities as far as the galvanizing facility described below.

Galvanizing Treatment or Galvannealing Treatment

After the steel sheet is cooled at the primary cooling rate described above, the steel sheet is dipped in a zinc coating bath to be galvanized. The galvanizing treatment may be performed by a typical method. The steel sheet which had been dipped in the zinc coating bath to be galvanized may be subjected to an alloying treatment for zinc coating if needed. In such a case, alloying of the zinc coating can be performed by, for example, heating the steel sheet to a temperature range of 500° C. to 650° C. after the galvanizing treatment and holding the temperature for several seconds to several tens of seconds. Regarding the zinc coating conditions, the coating weight is 20 to 70 $g/m^2$ per side and the Fe content in the coating layer is preferably 6% to 15% if alloying is to be performed.

Performing cooling to 150° C. at average cooling rate of 5 to 100° C./sec after galvanizing or alloying If moderate cooling at an average cooling rate (secondary cooling rate) of less than 5° C./sec is performed after galvanizing or alloying, a pearlite phase or a bainite phase is generated at around 400° C. to 500° C., and thus a desired amount of the martensite phase and the desired strength may not be obtained. At an average cooling rate exceeding 100° C./sec, not only the martensite phase would occur excessively but also the martensite phase becomes excessively hard, which may degrade ductility, bendability, and stretch flangeability. In order to inhibit precipitation of pearlite, carbides, etc., that adversely affect formability, the cooling stop temperature is to be 150° C. or lower. Thus, the average cooling rate (secondary cooling rate) after galvanizing or alloying is to be 5 to 100° C./sec. Moreover, cooling is to be conducted to a temperature of 150° C. or lower. In other words, cooling is performed by setting the cooling stop temperature to 150° C. or lower. In the disclosed embodiments, it is possible to perform temper rolling or use levelers to correct shape and adjust surface roughness of the final-product high strength galvanized steel sheet obtained after annealing. However, excessive strain would be introduced into the surface layer if excessive temper rolling is performed, which may result in formation of a rolled microstructure with stretched crystal grains and may lead to degradation of ductility and bendability. Thus, if temper rolling is to be conducted, the stretch ratio is preferably about 0.1% to 1.5%.

EXAMPLE 1

Molten steels having compositions shown in Table 1 were prepared in a converter and were each formed into a slab. Then hot rolling, cold rolling, primary annealing, soft reduction rolling, pickling, secondary annealing, coating, alloying, and temper rolling were performed under various conditions indicated in Table 2 so as to form high strength galvannealed steel sheets (product sheets) having a thickness of 1.6 mm. In galvanizing, the coating weight was adjusted to 50 g/m² per side (coating was performed on both sides) and the Fe content in the coating layer was adjusted to 9% to 12%.

TABLE 1

| Steel No. | Composition (mass %) | | | | | | | | | | | | | Ac1 *1 (° C.) | Ac3 *2 (° C.) | Reference |
|---|---|---|---|---|---|---|---|---|---|---|---|---|---|---|---|---|
| | C | Si | Mn | P | S | sol. Al | N | Nb | Ti | Mo | V | Cr | B | | | |
| A | 0.04 | 0.02 | 2.1 | 0.008 | 0.005 | 0.028 | 0.0021 | 0.04 | 0.02 | | | | | 701 | 832 | Comparative steel |
| B | 0.05 | 0.10 | 2.2 | 0.008 | 0.003 | 0.025 | 0.0033 | 0.02 | 0.02 | | 0.05 | 0.08 | 0.0005 | 704 | 831 | Example steel |
| C | 0.06 | 0.10 | 2.3 | 0.015 | 0.008 | 0.027 | 0.0039 | 0.06 | 0.03 | | | | | 701 | 829 | Example steel |
| D | 0.08 | 0.10 | 2.6 | 0.013 | 0.003 | 0.038 | 0.0033 | 0.05 | 0.06 | 0.15 | | 0.10 | | 700 | 831 | Example steel |
| E | 0.09 | 0.25 | 2.4 | 0.015 | 0.001 | 0.037 | 0.0035 | 0.04 | 0.04 | 0.12 | | 0.52 | 0.0010 | 713 | 828 | Example steel |
| F | 0.11 | 0.55 | 2.6 | 0.038 | 0.003 | 0.028 | 0.0034 | 0.04 | 0.02 | | | | 0.0008 | 711 | 835 | Example steel |
| G | 0.08 | 0.20 | 3.1 | 0.025 | 0.009 | 0.049 | 0.0052 | 0.05 | 0.04 | | | | | 696 | 822 | Example steel |
| H | 0.14 | 0.25 | 2.8 | 0.019 | 0.005 | 0.039 | 0.0031 | 0.04 | 0.03 | | | | | 700 | 802 | Example steel |
| I | 0.13 | 0.15 | 3.0 | 0.018 | 0.007 | 0.038 | 0.0032 | 0.02 | 0.08 | | | | | 695 | 813 | Example steel |
| J | 0.12 | 0.02 | 3.3 | 0.008 | 0.005 | 0.033 | 0.0035 | 0.03 | 0.07 | | | | | 688 | 788 | Example steel |
| K | 0.13 | 0.03 | 3.1 | 0.010 | 0.002 | 0.035 | 0.0033 | 0.07 | 0.006 | | | | | 691 | 769 | Example steel |
| L | 0.12 | 0.02 | 3.1 | 0.012 | 0.003 | 0.029 | 0.0036 | 0.007 | 0.06 | | | | | 690 | 792 | Example steel |
| M | 0.13 | 0.15 | 3.1 | 0.055 | 0.013 | 0.041 | 0.0025 | 0.004 | 0.004 | | | | | 694 | 807 | Comparative steel |
| N | 0.16 | 1.15 | 3.6 | 0.008 | 0.008 | 0.030 | 0.0035 | 0.11 | 0.11 | | | | | 718 | 834 | Comparative steel |

*1: Ac1 = 723 − 10.7Mn + 29.1Si + 16.9Cr
*2: Ac3 = 910 − 203√C + 44.7Mn + 104V + 31.5Mo − 30Mn − 11Cr + 700P + 400 sol.Al + 400Ti

TABLE 2

| Steel sheet No. | Steel No. | Hot rolling step | | | | | Cold rolling step Rolling reduction (%) | Primary annealing step | | | |
|---|---|---|---|---|---|---|---|---|---|---|---|
| | | Slab heating temperature (° C.) | Finish temperature (° C.) | Average cooling rate (° C./sec)*1 | Coiling temperature (° C.) | Cooling start time (sec) | | Average heating rate from 600° C. to 750° C. (° C./sec) | Annealing temperature (° C.) | Annealing temperature holding time (sec) | Average cooling rate (° C./sec)*2 |
| 1 | A | 1220 | 890 | 50 | 550 | 2 | 50 | 1 | 800 | 100 | 5 |
| 2 | B | 1220 | 890 | 50 | 550 | 2 | 50 | 1 | 800 | 100 | 5 |
| 3 | C | 1220 | 890 | 50 | 550 | 2 | 50 | 1 | 800 | 100 | 5 |
| 4 | D | 1220 | 890 | 50 | 550 | 3 | 50 | 1 | 800 | 100 | 5 |
| 5 | E | 1220 | 890 | 50 | 550 | 3 | 50 | 1 | 800 | 100 | 5 |
| 6 | F | 1220 | 890 | 50 | 550 | 1 | 50 | 1 | 800 | 100 | 5 |
| 7 | G | 1220 | 890 | 50 | 550 | 1 | 50 | 1 | 800 | 100 | 5 |
| 8 | H | 1220 | 890 | 50 | 550 | 1 | 50 | 1 | 830 | 100 | 5 |
| 9 | I | 1220 | 890 | 50 | 550 | 1 | 50 | 1 | 830 | 100 | 5 |
| 10 | J | 1220 | 890 | 50 | 550 | 2 | 50 | 1 | 830 | 100 | 5 |
| 11 | K | 1220 | 890 | 50 | 550 | 2 | 50 | 1 | 830 | 100 | 5 |
| 12 | L | 1220 | 890 | 50 | 550 | 2 | 50 | 1 | 830 | 100 | 5 |
| 13 | M | 1220 | 890 | 50 | 550 | 2 | 50 | 1 | 830 | 100 | 5 |
| 14 | N | 1220 | 890 | 50 | 550 | 2 | 50 | 1 | 830 | 100 | 5 |

| Steel sheet No. | Soft reduction rolling step Rolling reduction (%) | Pickling step*3 Pickling weight loss (g/m²) | Secondary annealing step | | | | | Temper rolling step Elongation (%) |
|---|---|---|---|---|---|---|---|---|
| | | | Annealing temperature (° C.) | Annealing temperature holding time (sec) | Primary cooling rate (° C./sec)*4 | Alloying condition | Secondary cooling rate (° C./sec)*5 | |
| 1 | 0.7 | 0.5 | 800 | 100 | 3 | 520° C. × 20 s | 15 | 0.3 |
| 2 | 0.7 | 0.5 | 800 | 100 | 3 | 520° C. × 20 s | 15 | 0.3 |
| 3 | 0.7 | 0.5 | 800 | 100 | 3 | 520° C. × 20 s | 15 | 0.3 |
| 4 | 0.7 | 0.5 | 800 | 100 | 3 | 520° C. × 20 s | 15 | 0.3 |
| 5 | 0.7 | 0.5 | 800 | 100 | 3 | 520° C. × 20 s | 15 | 0.3 |
| 6 | 0.7 | 0.5 | 800 | 100 | 3 | 520° C. × 20 s | 15 | 0.3 |
| 7 | 0.7 | 0.5 | 800 | 100 | 3 | 520° C. × 20 s | 15 | 0.3 |
| 8 | 0.7 | 0.5 | 830 | 100 | 3 | 520° C. × 20 s | 15 | 0.3 |
| 9 | 0.7 | 0.5 | 830 | 100 | 3 | 520° C. × 20 s | 15 | 0.3 |
| 10 | 0.7 | 0.5 | 830 | 100 | 3 | 520° C. × 20 s | 15 | 0.3 |
| 11 | 0.7 | 0.5 | 830 | 100 | 3 | 520° C. × 20 s | 15 | 0.3 |
| 12 | 0.7 | 0.5 | 830 | 100 | 3 | 520° C. × 20 s | 15 | 0.3 |

TABLE 2-continued

| | | | | | | | | |
|---|---|---|---|---|---|---|---|---|
| 13 | 0.7 | 0.5 | 830 | 100 | 3 | 520° C. × 20 s | 15 | 0.3 |
| 14 | 0.7 | 0.5 | 830 | 100 | 3 | 520° C. × 20 s | 15 | 0.3 |

[1]Average cooling rate from finish temperature to 100° C. below finish temperature
[2]Average cooling rate from annealing temperature to a temperature (cooling stop temperature) of 600° C. or lower
[3]Performing pickling for 10 seconds with a 5% hydrochloric acid at 60° C.
[4]Average cooling rate from annealing temperature to zinc coating bath temperature
[5]Average cooling rate to a temperature 150° C. or lower after galvanizing of alloying of zinc coating A sample was taken from each of the galvannealed steel sheets obtained as above. Structural observation, hardness measurement, tensile test in a tensile direction (C direction) 90° with respect to the rolling direction, bend test, and plane bend fatigue test were conducted by the following procedures to identify the steel sheet microstructure and measure the area fractions of the ferrite phase, the martensite phase, and the bainite phase, the yield strength (YP), the tensile strength (TS), the total elongation (El), the limit bend radius, and the fatigue resistance (endurance ratio). The appearance after coating and appearance after alloying were observed visually to evaluate the surface properties. The procedures for evaluation are specifically described below.

(i) Structural Observation

A test piece for structural observation was taken from a galvannealed steel sheet. An L section (perpendicular section taken parallel to the rolling direction) was mechanically polished, corroded with nital, and observed with a scanning electron microscope (SEM) at a magnification of 2000. From a structure photograph (SEM photograph) obtained thereby, the steel sheet microstructure at the position ½ of the thickness of the steel sheet (in other words, the region ⅜ to ⅝ of the thickness) was identified and the area fractions of the ferrite phase and the martensite phase were calculated. The steel sheet microstructure was identified from the microstructure photograph as follows: a slightly dark region was identified as a ferrite phase, a region with carbides formed in a lamellar pattern was identified as a pearlite phase, a region with carbides appearing in rows of dots was identified as a bainite phase, and particles with light shades were identified as a martensite phase and a retained austenite phase (retained γ). After the test piece was tempered at 250° C. for 4 hours, a microstructure photograph was taken in the same manner. A region with carbides generated in a lamellar pattern was assumed to be what used to be a pearlite phase before the heat treatment, a region with carbides formed in rows of dots was assumed to be what used to be a bainite phase or martensite phase before the heat treatment, and the area fractions thereof were again determined. Fine particles that remained to have light shades were assumed to be a retained γ phase. Then the area fraction of the martensite phase was determined from the difference in area fraction between these fine particles and the particles with light shades before the tempering treatment (martensite phase and retained γ phase). The area fraction of each phase was determined by stratifying and coloring each phase on a transparent OHP sheet, capturing the resulting image, digitalizing the captured image, and analyzing the resulting image with image analyzing software (Digital Image Pro Plus er. 4.0 produced by Microsoft Corporation).

(ii) Hardness Measurement

A test piece for hardness measurement was taken from each galvannealed steel sheet. An L section (perpendicular section taken parallel to the rolling direction) was mechanically polished. The Vickers hardness was measured at ten points at a position 5 µm away from the surface layer in the thickness direction, ten points at a position 15 µm away from the surface layer in the thickness direction, and ten points at a position ½ of the thickness, and the average of the hardness measured at 10 points was obtained for each position. For the positions 5 µm and 15 µm away from the surface layer, the ratio of the hardness relative to the hardness measured at the position ½ of the thickness was calculated. The measurement load was 1 gf at the positions 5 µm and 15 µm from the surface layer and 100 gf at the position ½ of the thickness.

(iii) Tensile Properties

A JIS No. 5 tensile test piece (JIS Z 2201) was taken from each of the galvannealed steel sheets such that the tensile direction was 90° (C direction) with respect to the rolling direction. A tensile test was conducted according to JIS Z 2241 to measure YP, TS, and El. The evaluation standard for the tensile test was whether TS≥780 MPa, preferably TS≥980 MPa, and more preferably TS≥1180 MPa, and whether TS×El≥15000 MPa·%.

(iv) Bendability (Limit Bend Radius)

Bend test pieces each having a width of 30 mm and a length of 100 mm were taken from each of the galvannealed steel sheets such that the rolling direction (L direction) was coincident with the bending direction. According to the V block bend method prescribed in JIS Z 2248, test was conducted at each bend radius at n=3. The bend radius at which occurrence of cracks was not observed in all three pieces was assumed to be the limit bend radius and evaluation was conducted by using the ratio of the limit bend radius to the sheet thickness. The presence/absence of cracks was determined by observing the outer side of the bend with a ×30 magnifying glass. Test pieces that had no cracks relative to the 30 mm width of the test piece were rated AA, test pieces that had five or less microcracks not longer than 0.2 µm relative to the 30 mm width of the test piece were rated A, and test pieces that had one or more cracks longer than 0.2 µm or that had more than five microcracks not longer than 0.2 µm relative to the 30 mm width of the test piece were rated F. Test pieces rated AA and A were assumed to be the test pieces that had no cracks. The evaluation standard for bendability was whether limit bend radius/thickness (R/t)≤3.0.

(v) Fatigue Resistance

A test piece for fatigue test had an R of 30.4 mm at a portion where stress was applied and a minimum width of 20 mm. Test was conducted according to JIS Z 2275 with completely reversed tension (stress ratio: 1) at a frequency of 20 Hz. The stress at which the number of reversal exceeded $10^7$ was assumed to be the fatigue limit (FL) and the endurance ratio (FL/TS) of the fatigue limit to the tensile strength (TS) was used in evaluation. The evaluation standard for the plane bend fatigue test was whether endurance ratio≥0.42, preferably endurance ratio≥0.45, and more preferably endurance ratio≥0.50.

(vi) Surface Properties

The appearance after coating was visually evaluated. Samples with no bare spots were rated A and samples with bare spots were rated F. The appearance after alloying was also evaluated. Samples with alloying non-uniformity were rated F and samples of uniform appearance free of alloying non-uniformity were rated A.

The obtained results are shown in Table 3.

TABLE 3

| Steel sheet No. | Steel No. | Microstructure at ½ of thickness | | | | Position ½t HV 0.1 | Hardness | | | |
|---|---|---|---|---|---|---|---|---|---|---|
| | | Ferrite Area fraction (%) | Martensite Area fraction (%) | Bainite Area fraction (%) | Balance* Area fraction (%) | | Position 5 μm from surface layer | | Position 15 μm from surface layer | |
| | | | | | | | HV 0.001 | Ratio to hardness at position ½t (%) | HV 0.001 | Ratio to hardness at position ½t (%) |
| 1 | A | 85 | 11 | 3 | 1(P) | 255 | 184 | 72 | 224 | 88 |
| 2 | B | 71 | 24 | 2 | 3(P) | 280 | 204 | 73 | 252 | 90 |
| 3 | C | 66 | 31 | 1 | 2(P) | 289 | 214 | 74 | 262 | 91 |
| 4 | D | 58 | 42 | 0 | 0 | 347 | 260 | 75 | 320 | 92 |
| 5 | E | 54 | 44 | 1 | 1(P) | 360 | 270 | 75 | 331 | 92 |
| 6 | F | 52 | 48 | 0 | 0 | 363 | 276 | 76 | 333 | 92 |
| 7 | G | 51 | 49 | 0 | 0 | 353 | 268 | 76 | 324 | 92 |
| 8 | H | 27 | 55 | 18 | 0 | 398 | 314 | 79 | 378 | 95 |
| 9 | I | 32 | 52 | 16 | 0 | 395 | 308 | 78 | 375 | 95 |
| 10 | J | 27 | 58 | 15 | 0 | 397 | 310 | 78 | 375 | 94 |
| 11 | K | 28 | 56 | 16 | 0 | 392 | 307 | 78 | 372 | 95 |
| 12 | L | 28 | 57 | 15 | 0 | 393 | 306 | 78 | 374 | 95 |
| 13 | M | 20 | 65 | 13 | 2(γ) | 402 | 318 | 79 | 383 | 95 |
| 14 | N | 1 | 81 | 17 | 1(γ) | 471 | 395 | 80 | 459 | 97 |

| Steel sheet No. | Material properties | | | | | | Surface properties | | Remarks |
|---|---|---|---|---|---|---|---|---|---|
| | YP (MPa) | TS (MPa) | El (%) | TS × El (MPa·%) | Minimum bend radius/thickness | Endurance ratio | Appearance after coating | Appearance after alloying | |
| 1 | 439 | 764 | 23.9 | 18260 | 0.3 | 0.36 | A*¹ | A*² | Comparative Example |
| 2 | 459 | 840 | 21.5 | 18060 | 0.9 | 0.42 | A*¹ | A*² | Example |
| 3 | 535 | 868 | 21.1 | 18315 | 0.9 | 0.43 | A*¹ | A*² | Example |
| 4 | 670 | 1040 | 15.2 | 15808 | 1.6 | 0.46 | A*¹ | A*² | Example |
| 5 | 651 | 1082 | 14.7 | 15905 | 1.9 | 0.48 | A*¹ | A*² | Example |
| 6 | 626 | 1090 | 14.5 | 15805 | 1.9 | 0.48 | A*¹ | A*² | Example |
| 7 | 653 | 1060 | 15.0 | 15900 | 1.9 | 0.47 | A*¹ | A*² | Example |
| 8 | 701 | 1193 | 12.8 | 15270 | 2.5 | 0.51 | A*¹ | A*² | Example |
| 9 | 747 | 1186 | 12.8 | 15181 | 2.2 | 0.52 | A*¹ | A*² | Example |
| 10 | 751 | 1192 | 12.7 | 15138 | 2.5 | 0.52 | A*¹ | A*² | Example |
| 11 | 738 | 1182 | 13.3 | 15721 | 2.5 | 0.51 | A*¹ | A*² | Example |
| 12 | 740 | 1185 | 12.9 | 15287 | 2.5 | 0.52 | A*¹ | A*² | Example |
| 13 | 607 | 1205 | 12.6 | 15183 | 3.0 | 0.53 | A*¹ | A*² | Comparative Example |
| 14 | 911 | 1415 | 9.2 | 13018 | 3.1 | 0.57 | A*¹ | A*² | Comparative Example |

*P: Pearlite, γ retained austenite (retained γ)
*¹No bare spots
*²No alloying non-uniformity Table 3 shows that the steel sheet Nos. 2 to 12 according to the disclosed embodiments satisfied TS≥780 MPa or higher (preferably TS≥980 MPa and more preferably TS≥1180 MPa), TS×El≥15000 MPa·%, R/t≤3.0, and endurance ratio≥0.42 (preferably endurance ratio≥0.45 and more preferably endurance ratio≥0.50). These steel sheets were high-strength steel sheets with excellent bendability and fatigue resistance. Moreover, bare spots and alloying non-uniformity were not observed and the steel sheets had excellent surface properties.

In contrast, Comparative Example No. 1 had the C content and the Mn content outside the ranges of the disclosed embodiments and thus the desired amount of martensite was not obtained. Thus, TS≥780 MPa and endurance ratio≥0.42 were not satisfied. In Comparative Example No. 13, the Nb content and the Ti content were below the ranges of the disclosed embodiments, precipitation strengthening of ferrite was thus insufficient, the bendability improving effect achieved by decreasing the difference in hardness between the martensite phase and ferrite was small, and R/t≤3.0 was not satisfied. In Comparative Example No. 14, the C content, the Si content, the Mn content, the Nb content, and the Ti content were beyond the ranges of the disclosed embodiments, an excessive amount of martensite was thus generated, El was degraded, and TS×El≥15000 MPa·% was not satisfied. Due to excessively large Nb content and Ti content, the rolling load applied during hot rolling was relatively high and productivity may be adversely affected thereby.

EXAMPLE 2

The molten steels having compositions of steels B, D, and H in Table 1 were prepared in a converter and casted into slabs. Then hot rolling, cold rolling, primary annealing, soft reduction rolling, pickling, secondary annealing, coating, and temper rolling were performed under various conditions shown in Table 4 to prepare high strength galvanized steel sheets (product sheets) having a thickness of 1.6 mm. Some of the steel sheets were alloyed after coating so as to form high strength galvannealed steel sheets (product sheets). in galvanizing, the coating weight was adjusted to 50 g/m² per side (both sides were coated) and the Fe content in the coating layer was adjusted to 9% to 12%.

TABLE 4

| Steel sheet No. | Steel No. | Slab heating temperature (° C.) | Hot rolling step ||||| Cold rolling step Rolling reduction (%) | Primary annealing step ||||
|---|---|---|---|---|---|---|---|---|---|---|---|
| | | | Finish temperature (° C.) | Average cooling rate (° C./sec)*1 | Coiling temperature (° C.) | Cooling start time (sec) | | Average heating rate from 600° C. to 750° C. (° C./sec) | Annealing temperature (° C.) | Annealing temperature holding time (sec) | Average cooling rate (° C./sec)*2 |
| 15 | B | 1220 | 890 | 50 | 550 | 2 | 50 | 1 | 800 | 100 | 5 |
| 16 | B | 1220 | 890 | 50 | 660 | 2 | 60 | 1 | 780 | 10 | 1 |
| 17 | B | 1220 | 890 | 50 | 440 | 2 | 60 | 1 | 780 | 300 | 5 |
| 18 | B | 1220 | 890 | 50 | 550 | 3 | 50 | 1 | 820 | 100 | 5 |
| 19 | B | 1220 | 890 | 50 | 550 | 3 | 50 | 1 | 820 | 100 | 5 |
| 20 | B | 1220 | 890 | 50 | 550 | 3 | 50 | 1 | 800 | 100 | 5 |
| 21 | B | 1220 | 890 | 50 | 550 | 3 | 50 | 1 | 800 | 100 | 5 |
| 22 | B | 1220 | 890 | 50 | 550 | 3 | 50 | 1 | 800 | 100 | 0.3 |
| 23 | B | 1220 | 890 | 50 | 550 | 3 | 50 | 1 | 820 | 100 | 0.3 |
| 24 | D | 1220 | 890 | 50 | 550 | 3 | 50 | 1 | 800 | 100 | 5 |
| 25 | D | 1220 | 890 | 50 | 550 | 1 | 50 | 2 | 820 | 100 | 5 |
| 26 | D | 1220 | 830 | 3 | 550 | 1 | 25 | 1 | 820 | 100 | 5 |
| 27 | D | 1220 | 890 | 50 | 550 | 2 | 50 | 1 | 730 | 100 | 5 |
| 28 | D | 1220 | 890 | 50 | 550 | 2 | 50 | 1 | 820 | 5 | 5 |
| 29 | D | 1220 | 890 | 50 | 550 | 2 | 50 | 1 | 820 | 100 | 5 |
| 30 | H | 1220 | 890 | 50 | 550 | 2 | 50 | 1 | 830 | 100 | 5 |
| 31 | H | 1220 | 890 | 100 | 500 | 2 | 40 | 1 | 840 | 50 | 3 |
| 32 | H | 1220 | 890 | 100 | 500 | 2 | 40 | 1 | 850 | 50 | 3 |
| 33 | H | 1220 | 890 | 100 | 500 | 2 | 40 | 0.03 | 820 | 100 | 5 |
| 34 | H | 1220 | 890 | 100 | 500 | 2 | 40 | 1 | 870 | 100 | 5 |
| 35 | H | 1220 | 890 | 100 | 500 | 2 | 40 | 1 | 820 | 300 | 30 |

| Steel sheet No. | Soft reduction rolling step Rolling reduction (%) | Pickling step*3 Pickling weight loss (g/m²) | Secondary annealing step |||||  Temper rolling step Elongation (%) | Remarks |
|---|---|---|---|---|---|---|---|---|---|
| | | | Annealing temperature (° C.) | Annealing temperature holding time (sec) | Primary cooling rate (° C./sec)*4 | Alloying condition | Secondary cooling rate (° C./sec)*5 | | |
| 15 | 0.7 | 0.5 | 800 | 100 | 3 | 520° C. × 20 s | 15 | 0.3 | Galvannealed steel sheet |
| 16 | 0.7 | 0.5 | 780 | 50 | 1 | — | 15 | 0.3 | Galvanized steel sheet |
| 17 | 0.7 | 0.5 | 780 | 50 | 10 | — | 15 | 0.3 | Galvanized steel sheet |
| 18 | 0.7 | 0.01 | 800 | 100 | 3 | 520° C. × 20 s | 15 | 0.3 | Galvannealed steel sheet |
| 19 | 0.7 | 0.5 | 800 | 100 | 3 | 520° C. × 20 s | 3 | 0.3 | Galvannealed steel sheet |
| 20 | 0.2 | 0.5 | 800 | 100 | 3 | 520° C. × 20 s | 150 | 0.3 | Galvannealed steel sheet |
| 21 | 0.7 | 0.5 | 800 | 100 | 0.3 | 520° C. × 20 s | 150 | 0.3 | Galvannealed steel sheet |
| 22 | 0.7 | 7 | 800 | 100 | 3 | — | 15 | 0.3 | Galvanized steel shee |
| 23 | 0.7 | 0.5 | 740 | 100 | 3 | — | 15 | 0.3 | Galvanized steel shee |
| 24 | 0.7 | 0.5 | 800 | 100 | 3 | 520° C. × 20 s | 15 | 0.3 | Galvannealed steel sheet |
| 25 | 0.7 | 0.5 | 820 | 100 | 10 | 520° C. × 20 s | 50 | 0.3 | Galvannealed steel sheet |
| 26 | 0.7 | 0.5 | 800 | 100 | 3 | 520° C. × 20 s | 15 | 0.3 | Galvannealed steel sheet |
| 27 | 0.7 | 0.5 | 800 | 100 | 3 | 520° C. × 20 s | 15 | 0.3 | Galvannealed steel sheet |
| 28 | 0.7 | 0.5 | 800 | 100 | 3 | 520° C. × 20 s | 15 | 0.3 | Galvannealed steel sheet |
| 29 | 2.5 | 0.5 | 800 | 100 | 3 | 520° C. × 20 s | 15 | 0.3 | Galvannealed steel sheet |
| 30 | 0.7 | 0.5 | 830 | 100 | 3 | 520° C. × 20 s | 15 | 0.3 | Galvannealed steel sheet |
| 31 | 1.2 | 0.5 | 830 | 100 | 10 | 520° C. × 20 s | 15 | 0.3 | Galvannealed steel sheet |

TABLE 4-continued

| | | | | | | | | | |
|---|---|---|---|---|---|---|---|---|---|
| 32 | 1.5 | 0.5 | 840 | 100 | 0.2 | 520° C. × 20 s | 15 | 0.3 | Galvannealed steel sheet |
| 33 | 0.7 | 0.5 | 840 | 100 | 30 | 520° C. × 20 s | 15 | 0.3 | Galvannealed steel sheet |
| 34 | 0.7 | 0.5 | 840 | 100 | 30 | 520° C. × 20 s | 15 | 0.3 | Galvannealed steel sheet |
| 35 | 0.7 | 0.5 | 840 | 100 | 30 | 520° C. × 20 s | 15 | 0.3 | Galvannealed steel sheet |

*[1]Average cooling rate from finish temperature to 100° C. below finish temperature
*[2]Average cooling rate from annealing temperature to a temperature (cooling stop temperature) of 600° C. or lower
*[3]Performing pickling for 10 seconds with a 5% hydrochloric acid at 60° C.
*[4]Average cooling rate from annealing temperature to zinc coating bath temperature
*[5]Average cooling rate to a temperature 150° C. or lower after galvanizing of alloying of zinc coating The galvannealed steel sheets obtained as above had their steel sheet microstructures identified by the same method as in Example 1, the area fractions of the ferrite phase, the martensite phase, and the bainite phase, the yield strength (YP), the tensile strength (TS), the total elongation (El), the limit bend radius, and the fatigue resistance were measured, and appearance after coating and appearance after alloying were visually observed to evaluate surface properties.

The results are indicated in Table 5.

TABLE 5

| | | Microstructure at ½ of thickness | | | | | Hardness | | | |
|---|---|---|---|---|---|---|---|---|---|---|
| | | | | | | | | Position 5 μm from surface layer | | Position 15 μm from surface layer |
| Steel sheet No. | Steel No. | Ferrite Area fraction (%) | Martensite Area fraction (%) | Bainite Area fraction (%) | Balance* Area fraction (%) | Position ½t HV 0.1 | HV 0.001 | Ratio to hardness at position ½t (%) | HV 0.001 | Ratio to hardness at position ½t (%) |
| 15 | B | 71 | 24 | 2 | 3(P) | 280 | 204 | 73 | 252 | 90 |
| 16 | B | 73 | 25 | 1 | 1(P) | 280 | 206 | 74 | 255 | 91 |
| 17 | B | 71 | 25 | 3 | 1(P) | 281 | 205 | 73 | 258 | 92 |
| 18 | B | 71 | 25 | 2 | 2(P) | 281 | 202 | 72 | 252 | 90 |
| 19 | B | 65 | 17 | 8 | 10(P) | 256 | 190 | 74 | 230 | 90 |
| 20 | B | 69 | 26 | 3 | 2(P) | 288 | 237 | 82 | 266 | 92 |
| 21 | B | 81 | 15 | 2 | 2(P) | 258 | 191 | 74 | 234 | 91 |
| 22 | B | 72 | 23 | 2 | 3(P) | 279 | 203 | 73 | 252 | 90 |
| 23 | B | 85 | 13 | 1 | 1(P) | 250 | 180 | 72 | 232 | 93 |
| 24 | D | 58 | 42 | 0 | 0 | 347 | 260 | 75 | 320 | 92 |
| 25 | D | 54 | 46 | 0 | 0 | 352 | 266 | 76 | 325 | 92 |
| 26 | D | 57 | 43 | 0 | 0 | 349 | 262 | 75 | 320 | 92 |
| 27 | D | 57 | 43 | 0 | 0 | 349 | 282 | 81 | 321 | 92 |
| 28 | D | 56 | 44 | 0 | 0 | 351 | 288 | 82 | 322 | 92 |
| 29 | D | 56 | 44 | 0 | 0 | 350 | 256 | 73 | 300 | 86 |
| 30 | H | 27 | 55 | 18 | 0 | 398 | 314 | 79 | 378 | 95 |
| 31 | H | 25 | 55 | 20 | 0 | 397 | 312 | 79 | 372 | 94 |
| 32 | H | 26 | 54 | 20 | 0 | 397 | 310 | 78 | 365 | 92 |
| 33 | H | 18 | 71 | 11 | 0 | 425 | 333 | 78 | 398 | 94 |
| 34 | H | 4 | 83 | 15 | 0 | 446 | 351 | 79 | 415 | 93 |
| 35 | H | 19 | 72 | 9 | 0 | 429 | 331 | 77 | 395 | 92 |

| Steel sheet No. | Material properties | | | | | | Surface properties | | Remarks |
|---|---|---|---|---|---|---|---|---|---|
| | YP (MPa) | TS (MPa) | El (%) | TS × El (MPa · %) | Minimum bend radius/thickness | Endurance ratio | Appearance after coating | Appearance after alloying | |
| 15 | 459 | 840 | 21.5 | 18060 | 0.9 | 0.42 | A*[1] | A*[2] | Example |
| 16 | 460 | 840 | 21.2 | 17808 | 1.3 | 0.42 | A*[1] | — | Example |
| 17 | 462 | 843 | 21.8 | 18377 | 1.3 | 0.43 | A*[1] | — | Example |
| 18 | 460 | 835 | 21.3 | 17786 | 0.9 | 0.43 | F*[3] | F*[5] | Comparative Example |
| 19 | 422 | 768 | 24.3 | 18662 | 0.6 | 0.43 | A*[1] | A*[2] | Comparative Example |
| 20 | 481 | 853 | 20.4 | 17401 | 3.1 | 0.43 | A*[1] | A*[2] | Comparative Example |
| 21 | 427 | 775 | 24.1 | 18678 | 0.6 | 0.44 | A*[1] | A*[2] | Comparative Example |
| 22 | 458 | 837 | 21.5 | 17996 | 0.9 | 0.43 | F*[4] | — | Comparative Example |
| 23 | 413 | 750 | 25.0 | 18750 | 0.9 | 0.46 | A*[1] | A*[2] | Comparative Example |
| 24 | 670 | 1040 | 15.2 | 15808 | 1.9 | 0.46 | A*[1] | A*[2] | Example |
| 25 | 675 | 1055 | 15.2 | 16036 | 1.9 | 0.48 | A*[1] | A*[2] | Example |

TABLE 5-continued

| 26 | 669 | 1045 | 15.3 | 15989 | 2.2 | 0.45 | A*1 | A*2 | Example |
|----|-----|------|------|-------|-----|------|-----|-----|---------|
| 27 | 688 | 1051 | 15.1 | 15870 | 3.1 | 0.45 | A*1 | A*2 | Comparative Example |
| 28 | 690 | 1054 | 14.9 | 15705 | 3.1 | 0.42 | A*1 | A*2 | Comparative Example |
| 29 | 678 | 1046 | 15.1 | 15795 | 2.2 | 0.39 | A*1 | A*2 | Comparative Example |
| 30 | 701 | 1193 | 12.8 | 15270 | 2.5 | 0.51 | A*1 | A*2 | Example |
| 31 | 700 | 1190 | 12.9 | 15351 | 2.8 | 0.50 | A*1 | A*2 | Example |
| 32 | 699 | 1192 | 12.9 | 15377 | 2.5 | 0.49 | A*1 | A*2 | Example |
| 33 | 822 | 1275 | 11.8 | 15045 | 3.8 | 0.51 | A*1 | A*2 | Comparative Example |
| 34 | 925 | 1338 | 10.2 | 13648 | 3.8 | 0.51 | A*1 | A*2 | Comparative Example |
| 35 | 835 | 1287 | 11.8 | 15187 | 3.4 | 0.50 | A*1 | A*2 | Comparative Example |

*P: Pearlite
*1No bare spots
*2No alloying non-uniformity
*3Bare spots found
*4Surface roughness found
*5Alloying non-uniformity found According to Table 5, the steel sheets of Nos. 15 to 17, 24 to 26, and 30 to 32 according to the disclosed embodiments satisfied TS≥780 MPa or higher (preferably TS≥980 MPa and more preferably TS≥1180 MPa), TS×El≥15000 MPa·%, R/t≤3.0, and endurance ratio≥0.42 (preferably endurance ratio≥0.45 and more preferably endurance ratio≥0.50). These steel sheets were high strength steel sheets with excellent bendability and fatigue properties. Moreover, bare spots and non-uniform alloying were not observed and the steel sheets had excellent surface properties.

In contrast, in Comparative Example No. 18, the pickling weight loss was below the range of the disclosed embodiments, removal of the surface oxides by pickling was therefore insufficient, bare spots and alloying non-uniformity occurred, and surface properties were poor.

In Comparative Example No. 19, the secondary cooling rate during secondary annealing was below the range of the disclosed embodiments, the desired amount of martensite was thus not obtained, and TS≥780 MPa was not satisfied.

In Comparative Example No. 20, the rolling reduction during the soft reduction rolling step was below the range of the disclosed embodiments, grain growth near the superficial layer was thus insufficient, the hardness at the position 5 μm from the surface layer exceeded 80% of the hardness at the position ½ of the thickness, and R/t≤3.0 was not satisfied.

In Comparative Example No. 21, the primary cooling rate during the secondary annealing step was below the range of the disclosed embodiments and the amount of ferrite generated during cooling thus increased excessively. As a result, the desired amount of martensite was not obtained and TS≥780 MPa was not satisfied.

In Comparative Example No. 22, the pickling weight loss was beyond the range of the disclosed embodiments, the surface of the steel sheet became rough due to over pickling, and the surface properties were poor.

In Comparative Example No. 23, the annealing temperature during secondary annealing was below the range of the disclosed embodiments, the desired amount of martensite could thus not be obtained, and TS≥780 MPa was not satisfied.

In Comparative Example No. 27, the annealing temperature in the primary annealing step was below the range of the disclosed embodiments. Thus, a hard surface layer generated due to un-recrystallized microstructure after primary annealing remained, and R/t≤3.0 was not satisfied.

In Comparative Example No. 28, the annealing time in the primary annealing step was below the range of the disclosed embodiments. Thus, a hard surface layer generated due to un-recrystallized microstructure after primary annealing remained, and R/t≤3.0 was not satisfied.

In Comparative Example No. 29, the rolling reduction in the soft reduction rolling step was beyond the range of the disclosed embodiments. Thus, the depth of the soft layer after secondary annealing due to enlargement in the range where rolling strain was introduced increased, the hardness at a position 15 μm from the surface layer was lower than 90% of the hardness at the position ½ of the thickness, and endurance ratio≥0.42 was not satisfied.

In Comparative Example No. 33, the average heating rate from 600° C. to 750° C. in the primary annealing step was below the range of the disclosed embodiments. Thus, an excessive amount of the martensite layer was generated after primary annealing, an excessive amount of the martensite phase was generated after secondary annealing because of this, and thus R/t≤3.0 was not satisfied.

In Comparative Example No. 34, the annealing temperature in the primary annealing step was beyond the range of the disclosed embodiments. Thus, generation of the ferrite phase was inhibited and an excessive amount of the martensite phase was generated. As a result, the area fraction of the ferrite was below the range of the disclosed embodiments, the area fraction of the martensite phase was beyond the range of the disclosed embodiments, and thus TS×El≥15000 MPa·% and R/t≤3.0 were not satisfied.

In Comparative Example No. 35, the primary cooling rate was beyond the range of the disclosed embodiments. Thus, generation of the ferrite phase during cooling was inhibited and an excessive amount of the martensite phase was generated. As a result, the area fraction of the martensite phase was beyond the range of the disclosed embodiments and R/t≤3.0 was not satisfied.

INDUSTRIAL APPLICABILITY

A galvanized steel sheet according to the disclosed embodiments not only has high tensile strength but also has excellent surface appearance quality and excellent bendability and fatigue resistance. Thus, when the steel sheet of the disclosed embodiments is applied to a frame part of an automotive body, crash safety properties are improved and weight-reduction is promoted. Furthermore, the steel sheet is suitable for not only automotive parts but also raw materials of buildings and home electric appliances.

The invention claimed is:

1. A high strength galvanized steel sheet having a composition comprising, in terms of % by mass, C: 0.05% or more and 0.15% or less, Si: 0.01% or more and 1.00% or less, Mn: 2.2% or more and 3.5% or less, P: 0.001% or more and 0.050% or less, S: 0.010% or less, sol. Al: 0.005% or more and 0.100% or less, N: 0.0001% or more and 0.0060% or less, at least one element selected from the group consisting of Nb: 0.01% or more and 0.10% or less and Ti: 0.01% or more and 0.10% or less, and the balance being Fe and unavoidable impurities,
wherein a microstructure at a position ½ of a thickness of the steel sheet includes 5% or more and 80% or less of a ferrite phase in terms of area fraction, 20% or more and 70% or less of a martensite phase in terms of area fraction, and 0% or more and 25% or less of a bainite phase in terms of area fraction,
a hardness at a position 5 μm from a surface layer of the steel sheet in a thickness direction is 80% or less of a hardness at the position ½ of the thickness,
a hardness at a position 15 μm from the surface layer of the steel sheet in the thickness direction is 90% or more of the hardness at the position ½ of the thickness, and
the high strength galvanized steel sheet has a tensile strength of 780 MPa or higher.

2. The high strength galvanized steel sheet according to claim 1, wherein the composition further comprises, in terms of % by mass, at least one element selected from the group consisting of Mo: 0.05% or more and 1.00% or less, V: 0.02% or more and 0.50% or less, Cr: 0.05% or more and 1.00% or less, and B: 0.0001% or more and 0.0030% or less.

3. A method for producing a high strength galvanized steel sheet that has a tensile strength of 780 MPa or higher and includes, at a position ½ of a thickness of the steel sheet, 5% or more and 80% or less of a ferrite phase in terms of area fraction, 20% or more and 70% or less of a martensite phase in terms of area fraction, and 0% or more and 25% or less of a bainite phase in terms of area fraction, in which a hardness at a position 5 μm from a surface layer of the steel sheet in a thickness direction is 80% or less of a hardness at the position ½ of the thickness and a hardness at a position 15 μm from the surface layer of the steel sheet in the thickness direction is 90% or more of the hardness at the position ½ of the thickness, the method comprising:
hot rolling a steel slab having a composition comprising, in terms of % by mass, C: 0.05% or more and 0.15% or less, Si: 0.01% or more and 1.00% or less, Mn: 2.2% or more and 3.5% or less, P: 0.001% or more and 0.050% or less, 0.010% or less, sol. Al: 0.005% or more and 0.100% or less, N: 0.0001% or more and 0.0060% or less, at east one element selected from the group consisting of Nb: 0.01% or more and 0.10% or less and Ti: 0.01% or more and 0.10% or less, and the balance being Fe and unavoidable impurities;
cold rolling the resulting hot rolled sheet;
performing primary annealing, soft reduction rolling, pickling, and secondary annealing; and
galvanizing the resulting steel sheet,
wherein in the primary annealing, heating is carried out at an average heating rate of 0.1° C./second or more and less than 3° C./second in a temperature range of 600° C. to 750° C., an annealing temperature in the range of 750° C. to 850° C. is held for 10 to 500 seconds, and cooling is carried out at an average cooling rate in the range of 1 to 15° C./second from the annealing temperature to a cooling stop temperature not higher than 600° C.,
in the soft reduction rolling, soft reduction is carried out at a rolling reduction of 0.3% or more and 2.0% or less,
in the pickling, a pickling weight loss of the steel sheet is adjusted to be in the range of 0.05 to 5 g/m² on an Fe basis,
in the secondary annealing, an annealing temperature in the range of 750° C. to 850° C. is held for 10 to 500 seconds and cooling is then carried out at an average cooling rate in the range of 1 to 15° C./second from the annealing temperature, and the resulting steel sheet is dipped in a zinc coating bath to galvanize the steel sheet, and
cooling is carried out to a temperature of 150° C. or lower at an average cooling rate in the range of 5 to 100° C./second after the galvanizing.

4. The method for producing a high strength galvanized steel sheet according to claim 3, wherein in the hot rolling, cooling is started within 3 seconds after completion of finish rolling and the resulting steel sheet is cooled at an average cooling rate in the range of 5 to 200° C./second in a temperature range of a finish rolling temperature to 100° C. below the finish rolling temperature and is coiled at a coiling temperature in the range of 450° C. to 650° C., and
in the cold rolling, rolling is carried out at a rolling reduction of 30% or more.

5. The method for producing a high strength galvanized steel sheet according to claim 3, wherein the method further comprises alloying treatment after the galvanizing.

6. The method for producing a high strength galvanized steel sheet according to claim 4, wherein the method further comprises alloying treatment after the galvanizing.

7. A method for producing a high strength galvanized steel sheet that has a tensile strength of 780 MPa or higher and includes, at a position ½ of a thickness of the steel sheet, 5% or more and 80% or less of a ferrite phase in terms of area fraction, 20% or more and 70% or less of a martensite phase in terms of area fraction, and 0% or more and 25% or less of a bainite phase in terms of area fraction, in which a hardness at a position 5 μm from a surface layer of the steel sheet in a thickness direction is 80% or less of a hardness at the position ½ of the thickness and a hardness at a position 15 μm from the surface layer of the steel sheet in the thickness direction is 90% or more of the hardness at the position ½ of the thickness, the method comprising:
hot rolling a steel slab having a composition comprising, in terms of % by mass, C: 0.05% or more and 0.15% or less, Si: 0.01% or more and 1.00% or less, Mn: 2.2% or more and 3.5% or less, P: 0.001% or more and 0.050% or less, S: 0.010% or less, sol. Al: 0.005% or more and 0.100% or less, N: 0.0001% or more and 0.0060% or less, at least one element selected from the group consisting of Nb: 0.01% or more and 0.10% or less and Ti: 0.01% or more and 0.10% or less, at least one element selected from the group consisting of Mo: 0.05% or more and 1.00% or less, V: 0.02% or more and 0.50% or less, Cr: 0.05% or more and 1.00% or less, and B: 0.0001% or more and 0.0030% or less, and the balance being Fe and unavoidable impurities;
cold rolling the resulting hot rolled sheet;
performing primary annealing, soft reduction rolling, pickling, and secondary annealing; and
galvanizing the resulting steel sheet,
wherein in the primary annealing, heating is carried out at an average heating rate of 0.1° C./second or more and less than 3° C./second in a temperature range of 600° C. to 750° C., an annealing temperature in the range of 750° C. to 850° C. is held for 10 to 500 seconds, and cooling is carried out at an average cooling rate in the range of 1 to 15° C./second from the annealing temperature to a cooling stop temperature not higher than 600° C., in the soft reduction rolling, soft reduction is carried out at a rolling reduction of 0.3% or more and 2.0% or less, in the pickling, a pickling weight loss of the steel sheet is adjusted to be in the range of 0.05 to 5 g/m$^2$ on an Fe basis, in the secondary annealing, an annealing temperature in the range of 750° C. to 850° C. is held for 10 to 500 seconds and cooling is then carried out at an average cooling rate in the range of 1 to 15° C./second from the annealing temperature, and the resulting steel sheet is dipped in a zinc coating bath to galvanize the steel sheet, and cooling is carried out to a temperature of 150° C. or lower at an average cooling rate in the range of 5 to 100° C./second after the galvanizing.

8. The method for producing a high strength galvanized steel sheet according to claim 7, wherein in the hot rolling, cooling is started within 3 seconds after completion of finish rolling and the resulting steel sheet is cooled at an average cooling rate in the range of 5 to 200° C./second in a temperature range of a finish rolling temperature to 100° C. below the finish rolling temperature and is coiled at a coiling temperature in the range of 450° C. to 650° C., and in the cold rolling, rolling is carried out at a rolling reduction of 30% or more.

9. The method for producing a high strength galvanized steel sheet according to claim 7, wherein the method further comprises alloying treatment after the galvanizing.

10. The method for producing a high strength galvanized steel sheet according to claim 8, wherein the method further comprises alloying treatment after the galvanizing.

* * * * *